US012566575B2

(12) United States Patent
Lee et al.

(10) Patent No.: US 12,566,575 B2
(45) Date of Patent: Mar. 3, 2026

(54) CONTROLLER, STORAGE DEVICE AND COMPUTING SYSTEM

(71) Applicant: SK hynix Inc., Icheon-si (KR)

(72) Inventors: Jung Ho Lee, Icheon-si (KR); Min Su Son, Icheon-si (KR); Sung Ju Yoo, Icheon-si (KR); Ji Hun Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 106 days.

(21) Appl. No.: 18/415,061

(22) Filed: Jan. 17, 2024

(65) Prior Publication Data

US 2025/0085894 A1 Mar. 13, 2025

(30) Foreign Application Priority Data

Sep. 7, 2023 (KR) ......................... 10-2023-0118708

(51) Int. Cl.
*G06F 3/06* (2006.01)

(52) U.S. Cl.
CPC .......... *G06F 3/0659* (2013.01); *G06F 3/0656* (2013.01); *G06F 3/0658* (2013.01); *G06F 3/0604* (2013.01); *G06F 3/0679* (2013.01)

(58) Field of Classification Search
CPC .... G06F 3/0659; G06F 3/0656; G06F 3/0658; G06F 3/0604; G06F 3/0679
See application file for complete search history.

(56) References Cited

U.S. PATENT DOCUMENTS

| | | | |
|---|---|---|---|
| 2007/0179994 A1* | 8/2007 | Deguchi | ............. G06F 11/1469 |
| 2019/0278496 A1* | 9/2019 | Rowley | ................. G06F 3/0679 |
| 2022/0391132 A1 | 12/2022 | Agarwal et al. | |
| 2023/0118815 A1* | 4/2023 | Cheong | ............... G06F 12/0246 |
| | | | 711/154 |

FOREIGN PATENT DOCUMENTS

| | | |
|---|---|---|
| KR | 10-2022-0113146 A | 8/2022 |
| KR | 10-2022-0150180 A | 11/2022 |

* cited by examiner

*Primary Examiner* — Francisco A Grullon

(57) ABSTRACT

A storage device manages memory use data, such as map data which the storage device manages using a host memory, as journal data in a buffer memory located inside the storage device in a low power mode. The memory use data may be managed by updating journal data during the low power mode, and a command of a host device may be processed by updated journal data after switching from a low power mode to an active mode.

18 Claims, 10 Drawing Sheets

CONTROLLER, STORAGE DEVICE AND COMPUTING SYSTEM

CROSS-REFERENCE TO RELATED APPLICATION

The present application claims priority under 35 U.S.C. § 119 (a) to Korean Patent Application No. 10-2023-0118708 filed on Sep. 7, 2023 in the Korean Intellectual Property Office, which is incorporated herein by reference in its entirety.

BACKGROUND

1. Technical Field

Various embodiments of the disclosed technology generally relate to a controller, a storage device and a computing system.

2. Related Art

A storage device may include a memory that includes a plurality of memory cells. The storage device may include a controller that controls the memory. The controller may control an operation of writing data to the memory, reading data from the memory, or erasing data written to the memory according to a command received from an external device such as a host device.

The storage device may operate in a mode capable of reducing power consumption under control of the host device. While the storage device operates in a mode capable of reducing power consumption, the storage device may not communicate with the host device, or transmission and reception of data may not be performed.

When the storage device returns to operation in a normal mode and processes a command of the host device, because transmission and reception of data to and from the host device were not been performed in a previous mode, efficiency of processing the command of the host device may be degraded.

SUMMARY

Various embodiments of the disclosed technology are directed to providing measures capable of improving the efficiency of processing a command of a host device after a period in which a storage device operates in a power consumption mode while under the control of the host device.

According to the embodiments of the disclosed technology, it is possible to improve the efficiency of processing a command received from a host device after a period in which a storage device operates in a mode capable of reducing power consumption under control of the host device.

In an embodiment, a storage device may include: a memory; and a controller configured to control the memory, to store, in a buffer memory when receiving a mode change signal from a host device having a host memory, journal data corresponding to at least some of memory use data stored in the host memory, to process a command of the host device using the journal data, and to transmit a mode change acknowledgement signal, corresponding to the mode change signal, to the host device.

In an embodiment, a computing system may include: a host device including a host memory; and a memory device including a memory, and the memory device is configured to store, in a buffer memory when receiving a mode change signal from the host device, journal data corresponding to at least some of memory use data stored in the host memory and used to process a command of the host device, and to transmit a mode change acknowledgement signal corresponding to the mode change signal to the host device.

In an embodiment, a controller may include: a buffer memory; and a processor configured to store, in the buffer memory when receiving a mode change signal from a host device, journal data corresponding to at least some of map data stored in a host memory included in the host device, and to transmit a mode change acknowledgement signal corresponding to the mode change signal to the host device.

BRIEF DESCRIPTION OF THE DRAWINGS

FIG. 1 is a diagram illustrating a configuration of a storage device according to an embodiment of the disclosure.

FIGS. 2 to 4 are diagrams illustrating operations of a storage device in different modes according to embodiments of the disclosure.

FIGS. 8 and 9 are diagrams illustrating examples of a storage device storing journal data in a buffer memory according to embodiments of the disclosure.

DETAILED DESCRIPTION

Figure 5:
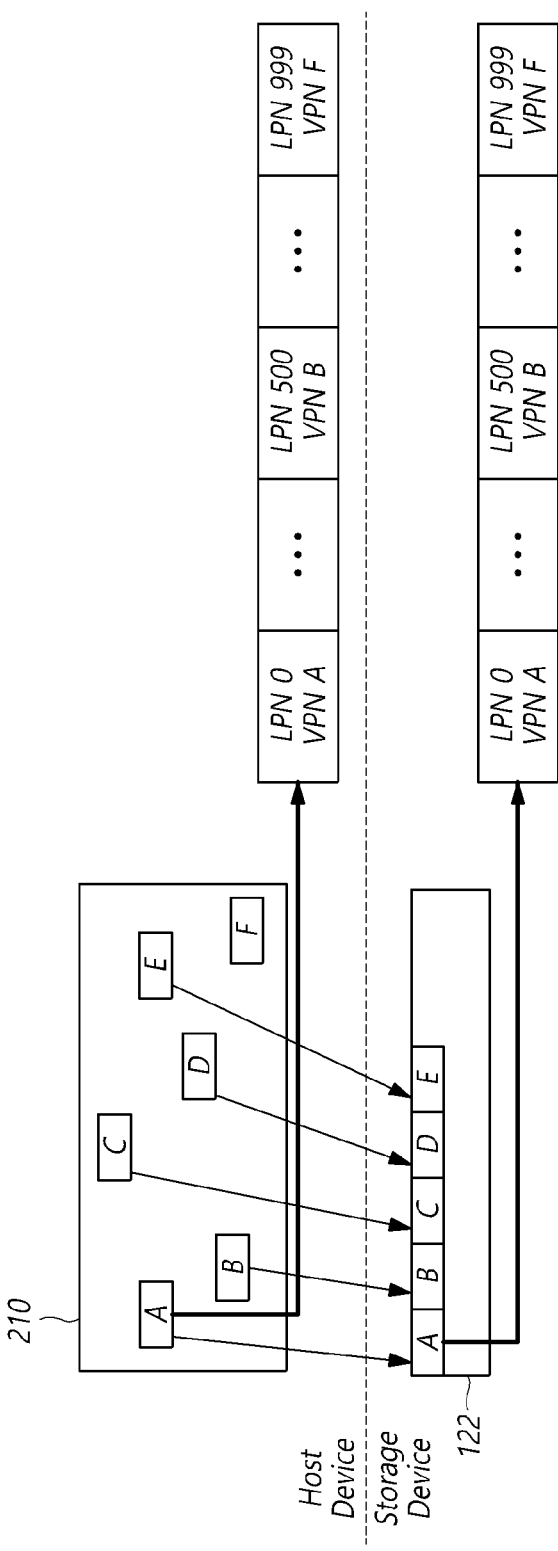
FIGS. 5 to 7 are diagrams illustrating storage devices using journal data to manage memory use data stored in a host memory in different operating modes according to embodiments of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Figure 1:
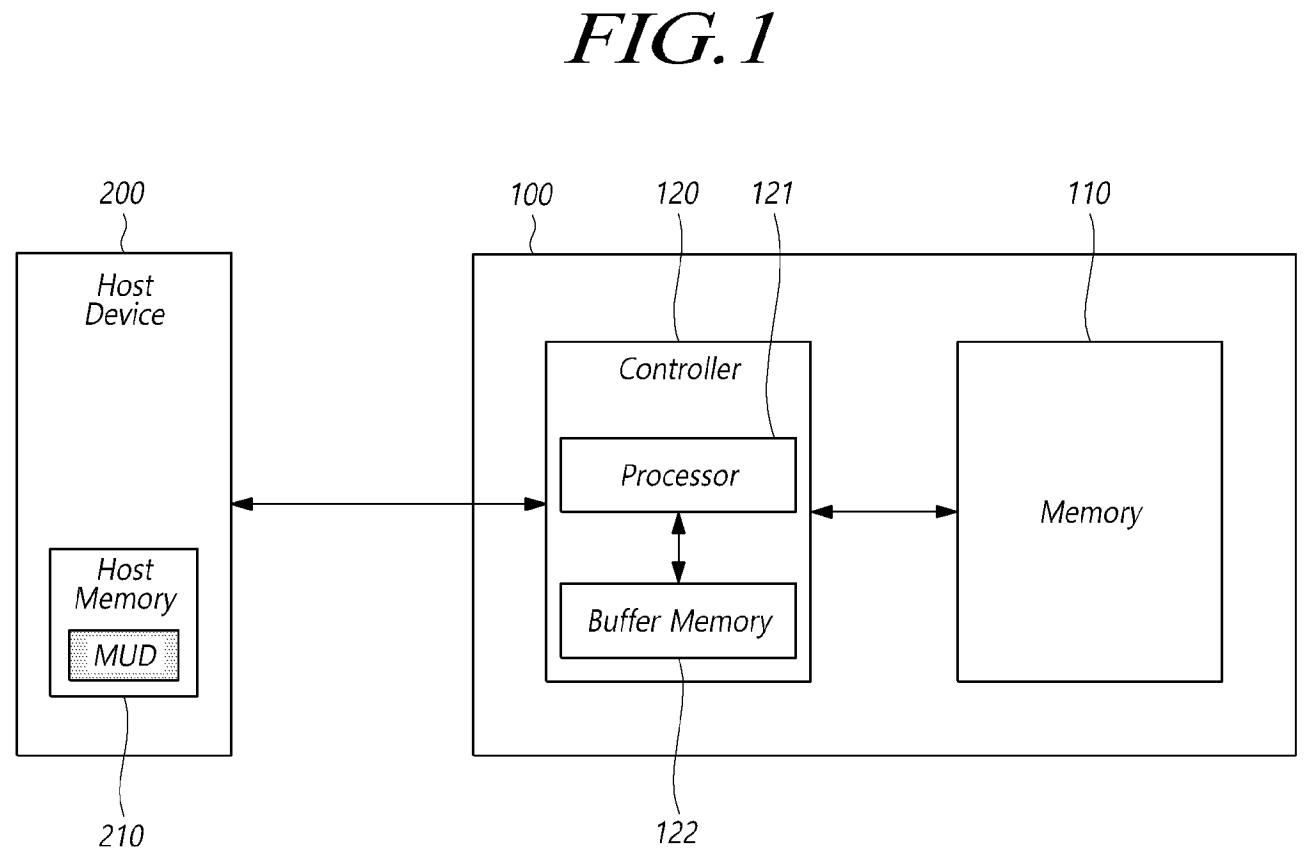

FIG. 1 is a diagram illustrating a configuration of a storage device according to an embodiment of the disclosure.

Referring to FIG. 1, a storage device 100 may include a memory 110. The storage device 100 may include a controller 120, which controls the memory 110.

For example, the memory 110 may be implemented into various types of memory such as a NAND flash memory, a 3D NAND flash memory, a NOR flash memory, a resistive random access memory, a phase-change random access memory, a magnetoresistive random access memory, a ferroelectric random access memory and a spin transfer torque random access memory. The memory 110 may be implemented in a three-dimensional array structure. Embodiments of the disclosure may be applied not only to a flash memory in which a charge storage layer is configured by a floating gate, but also to a charge trap flash in which a charge storage layer includes an insulating film.

The memory 110 may include a plurality of memory blocks (or storage blocks). The memory 110 may include a memory cell array including a plurality of memory cells that store data, and the memory cell array may exist in a memory block.

The memory 110 may operate in response to control of the controller 120. Operations of the memory 110 may include, for example, a program operation (also referred to as a "write operation"), an erase operation and a read operation.

The controller 120 may control program, erase, read and background operations that use the memory 110. Background operations may include, for example, at least one from among garbage collection, wear leveling, read reclaim and bad block management operations.

The controller 120 may control the operation of the memory 110 according to a request of a device located outside the storage device 100. The controller 120 may also control the operation of the memory 110 regardless, or in the absence, of a request from outside the storage device 100.

For example, the controller 120 may control the operation of the memory 110 according to a request of a host device 200. The storage device 100 and the host device 200 may be collectively referred to as a computing system.

For example, the host device 200 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, an RFID (radio frequency identification) device, a mobility device (e.g., a vehicle, a robot or a drone) capable of driving under human control or autonomous driving, or the like. Alternatively, the host device 200 may be a virtual/augmented reality device that provides a 2D or 3D virtual reality image or augmented reality image. The host device 200 may be any one of various electronic devices, each of which requires a storage device 100 capable of storing data.

The host device 200 may include at least one operating system. The operating system may manage and control overall functions and operations of the host device 200, and may control interoperations between the host device 200 and the storage device 100. The operating system may be classified into a general operating system and a mobile operating system depending on the mobility of the host device 200.

The controller 120 and the host device 200 may be devices that are separated from each other. In some cases, the controller 120 and the host device 200 may be implemented by incorporation into one device. Hereunder, for the sake of convenience in explanation, examples will describe the controller 120 and the host device 200 as devices that are separated from each other.

The controller 120 may include a host interface that provides an interface for communication with the host device 200. The controller 120 may include a memory interface that provides an interface for communication with the memory 110.

The controller 120 may include a control circuit that controls overall operations of the controller 120. The control circuit may include a processor 121 as shown in FIG. 1. The control circuit may include a working memory that is used for the operation of the processor 121, and may optionally include an error detection and correction circuit.

The processor 121 may communicate with the host device 200 through the host interface, and may communicate with the memory 110 through the memory interface.

The processor 121 may interpret commands inputted from the host device 200 and transfer the commands to the memory 110.

For example, the processor 121 may include a flash translation layer or may correspond to a flash translation layer. The processor 121 may translate a logical block address provided by the host device 200 into a physical block address. The processor 121 may receive a logical block address and translate the logical block address into a physical block address using a mapping table.

The processor 121 may control the operation of the controller 120 by executing, for example, firmware. In some embodiments, an operation of the storage device 100 may be implemented so that the processor 121 executes firmware in which the corresponding operation is defined.

Firmware, as a program to be executed in the storage device 100 to drive the storage device 100, may include various functional layers corresponding to the processor 121 described above. For example, the firmware may include binary data in which codes for executing the respective functional layers are defined.

For example, the firmware may be loaded into the working memory from the memory 110 or a separate nonvolatile memory (e.g., a ROM or a NOR Flash) located outside the memory 110. When executing a booting operation after power-on, the processor 121 may first load all or a part of the firmware in the working memory.

In order to control overall operations of the controller 120, the processor 121 may perform a logic operation that is defined in the firmware loaded into the working memory. According to a result of performing the logic operation defined in the firmware, the processor 121 may control the controller 120 to generate a command or a signal. When a part of firmware in which a logic operation to be performed is defined is not loaded in the working memory, the processor 121 may generate an event (e.g., an interrupt) for loading the corresponding part of the firmware in the working memory.

The working memory may store firmware, program codes, commands or data necessary to drive the controller 120. The working memory may be located inside or outside the controller 120. Working memories may be located inside and outside the controller 120.

The working memory may be a buffer memory 122 shown in FIG. 1. Alternatively, the working memory may be disposed separately from the buffer memory 122 shown in FIG. 1. The buffer memory 122 may be located inside or outside the controller 120.

The working memory or the buffer memory 122 may be, for example, a volatile memory that includes at least one from among an SRAM (static RAM), a DRAM (dynamic RAM) and an SDRAM (synchronous DRAM).

The processor 121 of the controller 120 may store data required for an operation when the capacity of the working memory or the buffer memory 122 included in the controller 120 is small, by utilizing a partial region of a host memory 210 included in the host device 200. The processor 121 may be allocated a partial region of the host memory 210, may store data in the allocated region, and may use the stored data when performing a required operation.

For example, the processor 121 may store memory use data MUD in the host memory 210 included in the host device 200. The memory use data MUD may be at least some of various types of data used by the processor 121 to control the operation of the controller 120 or the memory 110.

The memory use data MUD may be, for example, map data (MD), but embodiments of the disclosure are not limited thereto.

When the capacity of the working memory or the buffer memory 122 included in the controller 120 or the storage device 100 is reduced, the processor 121 may store the memory use data MUD in the host memory 210 and may use the memory use data MUD. The operational performance of the storage device 100 may be maintained when the capacity of the working memory or the buffer memory 122 included in the storage device 100 is reduced.

Embodiments of the disclosure may provide measures for managing and using the memory use data MUD stored in the host memory 210, depending on the operation mode of the storage device 100.

While increasing the operating efficiency of the storage device 100 through the use of the host memory 210, it is possible to prevent, by the use of the host memory 210, degradation in the operational performance of the storage device 100 in certain operation modes.

Figure 2:
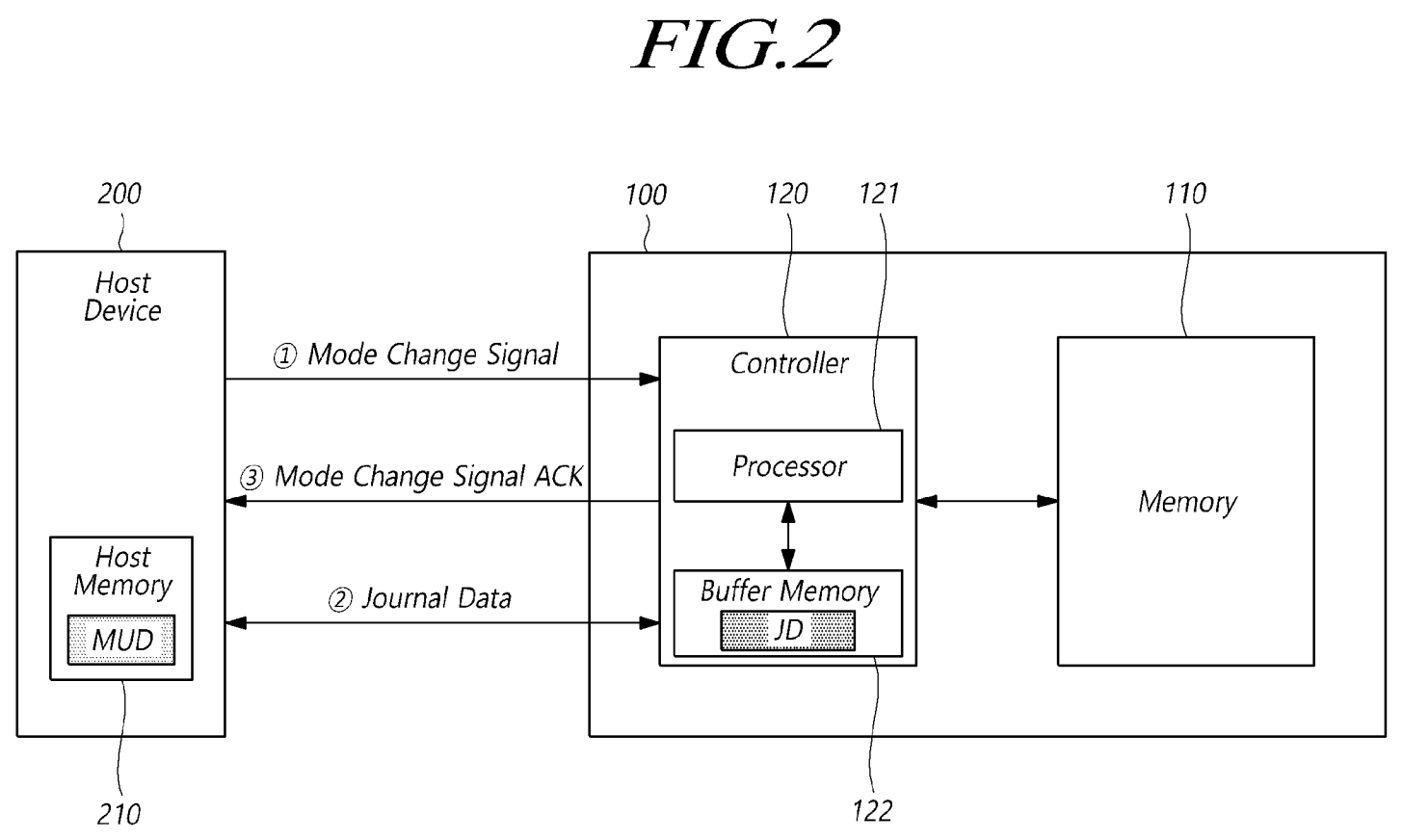
Figure 3:
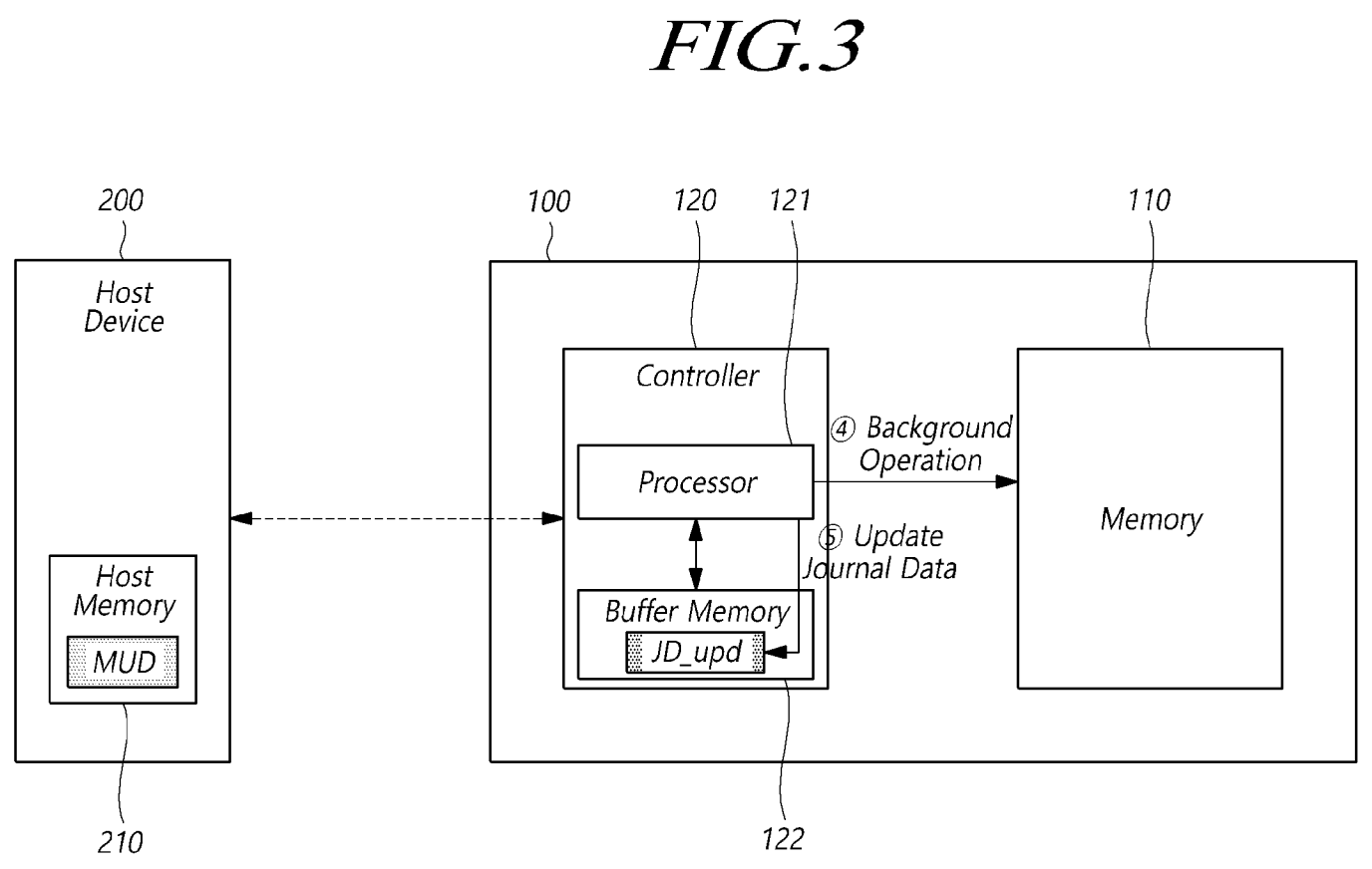
Figure 4:
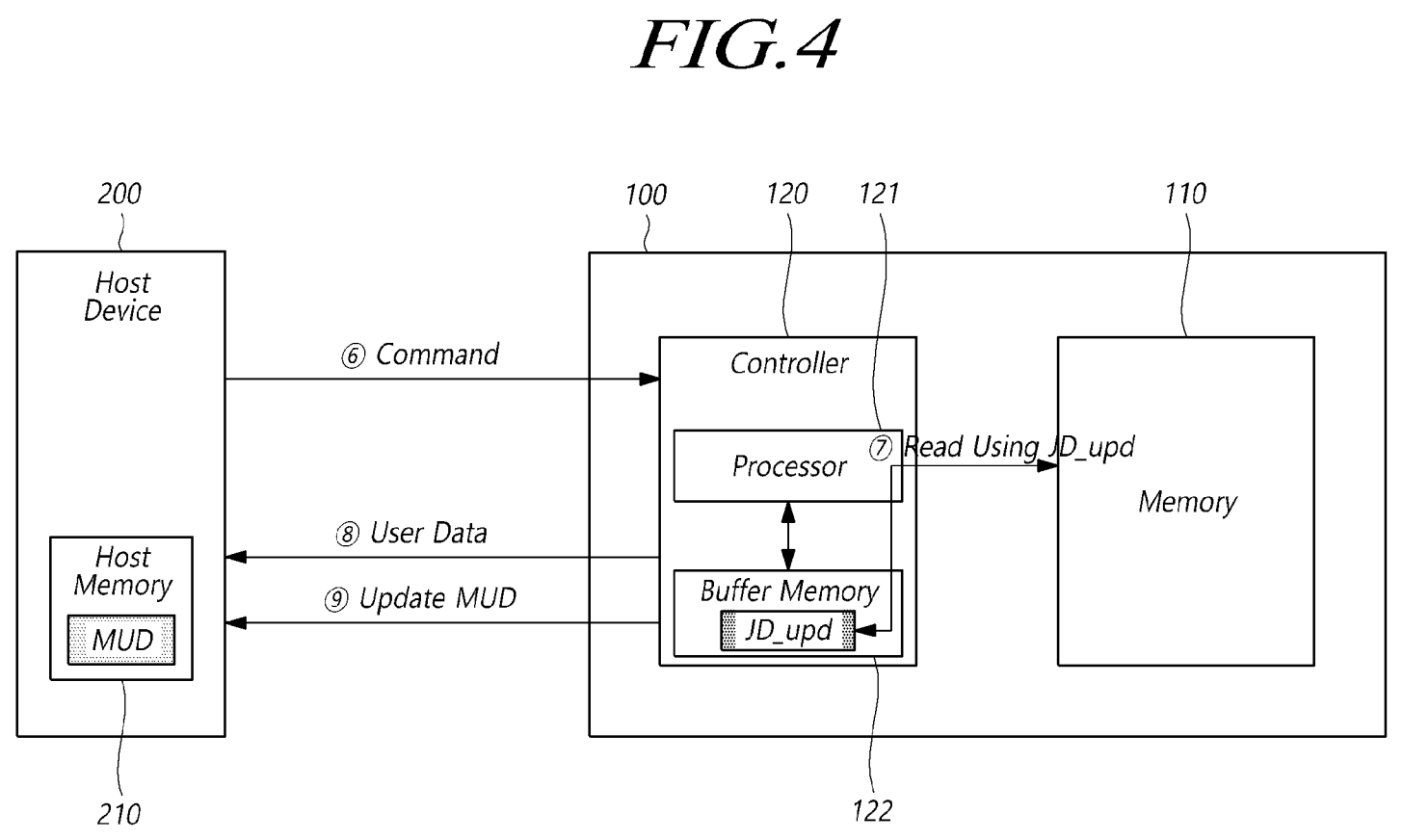

FIGS. 2 to 4 are diagrams illustrating operations of a storage device in different modes according to embodiments of the disclosure.

Referring to FIG. 2, a storage device 100 may include a memory 110 and a controller 120. The controller 120 may include a processor 121 and a buffer memory 122. In some embodiments, the buffer memory 122 may be located outside the controller 120.

A host device 200 may include a host memory 210. The storage device 100 may be allocated and use a partial region of the host memory 210. For example, the storage device 100 may store memory use data MUD in the host memory 210.

The memory use data MUD, which is data used for the operation of the storage device 100, may be map data (MD), as in an example described above, but is not limited to that example. The memory use data MUD may be a part of data that may be used, for the operation of the storage device 100, when stored in a volatile memory such as the buffer memory 122 or in a working memory included in the storage device 100.

Hereinafter, for the sake of convenience in explanation, the memory use data MUD is map data (MD) in some examples, but embodiments of the disclosure are not limited thereto.

While operating in an active mode, the storage device 100 may perform an operation according to a command received from the host device 200. According to a command of the host device 200, the storage device 100 may control an operation of writing data to the memory 110, reading data from the memory 110, or erasing data written to the memory 110.

For example, when performing an operation according to a read command from the host device 200, the controller 120 included in the storage device 100 may use the memory use data MUD stored in the host memory 210. The controller 120 may translate a logical block address into a physical block address using the memory use data MUD, and may provide data stored in the physical block address of the memory 110 to the host device 200.

Since the controller 120 processes a command of the host device 200 while accessing the host memory 210, performance may be improved compared to a case in which the controller 120 processes a command of the host device 200 using map data (MD) stored in the memory 110.

Referring to FIG. 2, the storage device 100 may operate in a mode capable of reducing power consumption under control of the host device 200.

For example, in a power consumption mode, the host device 200 may transmit a mode change signal to the controller 120 as in ①. The mode change signal may be, for example, a signal that instructs a switch from an active mode to a low power mode. In other embodiments, the mode change signal may be a signal that can signal change between at least three modes.

When receiving the mode change signal from the host device 200, the controller 120 may check the memory use data MUD stored in the host memory 210.

As illustrated in ②, the controller 120 may generate journal data JD corresponding to the memory use data MUD stored in the host memory 210. The controller 120 may store the journal data JD in the buffer memory 122.

For example, the journal data JD may be data that is the same as the memory use data MUD.

In other examples, the journal data JD may be various types of data that may identify or specify the memory use data MUD.

For example, when at least two memory use data MUD are consecutive, the journal data JD may be data that includes basic data corresponding to a first memory use data MUD and information on any number of memory use data MUD consecutive to the basic data.

The controller 120 may store the memory use data MUD in the buffer memory 122 without alteration, however, the capacity of the buffer memory 122 may be smaller than the capacity of the host memory 210. As a result, the controller 120 may generate journal data JD of a type that identifies or specifies the memory use data MUD.

The controller 120 may generate at least some of the memory use data MUD as journal data JD. When generating only some of the memory use data MUD as the journal data JD, the controller 120 may generate the journal data JD in the order of the most recently used memory use data MUD, and may be based on a predetermined capacity range of recently used memory use data MUD. The journal data JD corresponding to memory use data MUD may be stored in the buffer memory 122.

When generation and storage of the journal data JD is completed, the controller 120 may transmit a mode change acknowledgement signal to the host device 200 as in ③.

When the mode change acknowledgement signal is transmitted, at least one of the host device 200 and the storage device 100 may operate in a low power mode. In low power mode, some operations may not be performed. For example, communication between the host device 200 and the storage device 100 may not be performed. Alternatively, data transmission and reception between the host device 200 and the storage device 100 may not be performed in low power mode.

In low power mode, the storage device 100 may manage the journal data JD stored in the buffer memory 122.

For example, referring to FIG. 3, in low power mode, at least partial communication between the host device 200 and the storage device 100 may not be performed. For example, access to the host memory 210 by the controller 120 may not be permitted.

While operating in the low power mode, the processor 121 of the controller 120 may perform at least a part of a background operation as illustrated in ④.

When a background operation such as garbage collection is performed by the processor 121, the memory use data MUD previously stored in the host memory 210 may be changed. As seen in ⑤, the processor 121 may update journal data JD stored in the buffer memory 122, which is related to the memory use data MUD to be changed, and may store the updated journal data JD_upd in the buffer memory 122.

Although the processor 121 cannot access the host memory 210, by updating the journal data JD stored in the buffer memory 122, the memory use data MUD stored in the host memory 210 before the low power mode may be managed in an up-to-date state.

The processor 121 may manage the journal data JD stored in the buffer memory 122 until a signal or a command, received from the host device 200, instructs the storage device 100 to enter an active mode again. The processor 121 may update the journal data JD when a mode change occurs and save the update in the updated journal data JD_upd.

When receiving, from the host device 200, a command that instructs a mode change or a new operation, the processor 121 may process the command of the host device 200 using the updated journal data JD_upd.

For example, referring to FIG. 4, while operating in low power mode, the controller 120 may receive a command from the host device 200 as seen in ⑥.

According to the command received from the host device 200, the storage device 100 may enter an active mode. In some embodiments, before receiving the command, the storage device 100 may receive a signal or a command that instructs entry into an active mode.

The processor 121 may perform an operation according to the command received from the host device 200.

For example, when the command received from the host device 200 is a read command, the processor 121 may check the updated journal data JD_upd stored in the buffer memory 122 as seen in ⑦. When updated journal data JD_upd related to the command received from the host device 200 exists in the buffer memory 122, as seen in ⑧, the processor 121 may read user data stored in the memory 110 by using the corresponding updated journal data JD_upd.

After a period in which the processor 121 operates in low power mode, the processor 121 may process a command received from the host device 200 using the updated journal data JD_upd stored in the buffer memory 122. The processor 121 may not read map data (MD) stored in the memory 110 to process the command of the host device 200.

When map data (MD) related to a command of the host device 200 does not exist in the buffer memory 122, however, the processor 121 may process the command of the host device 200 by using map data (MD) stored in the memory 110.

In addition, the processor 121 may process a command of the host device 200 using the memory use data MUD stored in the host memory 210. The memory use data MUD stored in the host memory 210 may correspond to map data MD that was not updated during the low power mode.

The processor 121 may store, in the host memory 210, memory use data MUD corresponding to the updated journal data JD_upd used to process the command of the host device 200. For example, the host device 200 may read the updated journal data JD_upd stored in the buffer memory 122, and may store corresponding memory use data MUD in the host memory 210.

During a partial period of active mode, memory use data MUD that is stored in the buffer memory 122 and corresponds to the updated journal data JD_upd may be stored in the host memory 210. The partial period of active mode may be, for example, an idle period.

Based on the updated journal data JD_upd stored in the buffer memory 122 and managed during low power mode, the memory use data MUD stored in the host memory 210 may be updated as seen in ⑨. Since entire map data (MD) is not moved and the memory use data MUD stored in the host memory 210 is updated on the basis of the partial updated journal data JD_upd, operating efficiency after entering the active mode from the low power mode may be improved.

Since the storage device 100 stores and manages, in the buffer memory 122, the journal data JD corresponding to the memory use data MUD stored in the host memory 210, at least some of the memory use data MUD may be maintained, through updated journal data JD, in an up-to-date state during the period of the low power mode.

Since the storage device 100 processes a command of the host device 200 using the updated journal data JD_upd stored in the buffer memory 122, a command generated by the host device 200 after exiting the low power mode may be efficiently processed.

In addition, since the memory use data MUD stored in the host memory 210 is updated after low power mode, based on the updated journal data JD_upd that is updated during the low power mode, management of the memory use data MUD stored in the host memory 210, after leaving the low power mode, may be efficiently performed.

Figure 6:
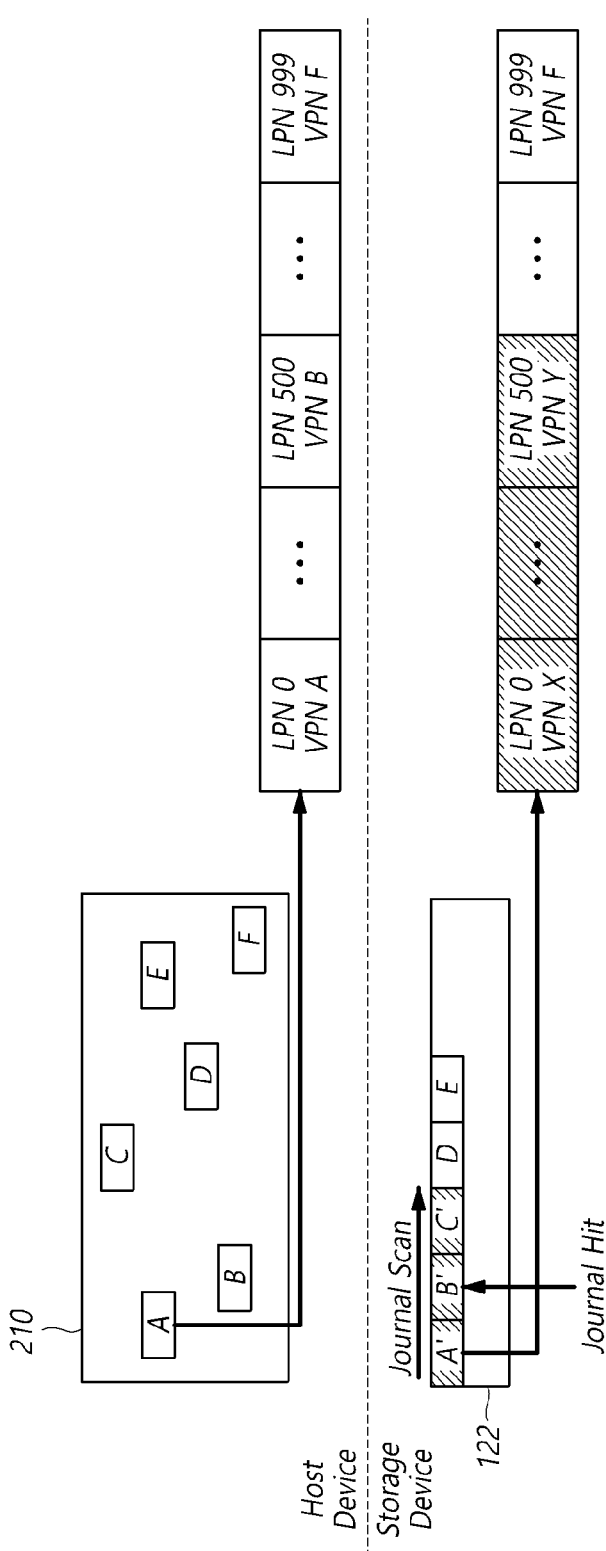
Figure 7:
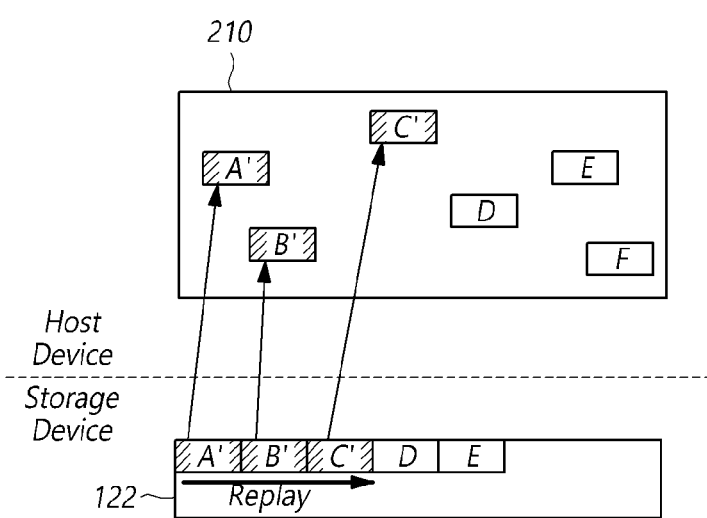

FIGS. 5 to 7 are diagrams illustrating storage devices using journal data to manage memory use data stored in a host memory in different operating modes according to embodiments of the disclosure.

Referring to FIG. 5, in an example, six memory use data MUD are stored in a host memory 210. Each of the memory use data MUD may include information indicating a mapping relationship between an LPN corresponding to a logical block address and a VPN corresponding to a physical block address.

When receiving a mode change signal from the host device 200, the processor 121 of the controller 120 may store, in the buffer memory 122, journal data JD corresponding to at least some of memory use data MUD stored in the host memory 210.

In an example, as shown in FIG. 5, the journal data JD may be data the same as the memory use data MUD.

In some embodiments, the journal data JD may be data including one basic data and information on the number of data consecutive to the basic data. For example, when the memory use data MUD A includes mapping information of LPN 0, LPN 1 and LPN 2, the journal data JD may include mapping information on LPN 0 and 2, which also represents the number of consecutive mapping information.

The type of the journal data JD may be set depending on the total size of the journal data JD that may be stored in the buffer memory 122.

The processor 121 may store, in the buffer memory 122, the journal data JD corresponding to at least some of the memory use data MUD stored in the host memory 210, depending on the capacity allowed by the buffer memory 122. The processor 121 may preferentially store, in the buffer memory 122, the journal data JD corresponding, from among the memory use data MUD stored in the host memory 210, to recently used memory use data MUD.

FIG. 5 shows an example in which the journal data JD corresponding to five memory use data MUD A, B, C, D and E, from among six memory use data MUD A, B, C, D, E and F stored in the host memory 210, is stored in the buffer memory 122.

Before entering low power mode or simultaneously with entering low power mode, the processor 121 may store and manage, in the buffer memory 122, the journal data JD corresponding to at least some of the memory use data MUD stored in the host memory 210.

The processor 121 may update the journal data JD, which is changed according to a background operation performed in low power mode. The processor 121 may process a command received from the host device 200 after low power mode, by using updated journal data JD_upd.

For example, referring to FIG. 6, after the journal data JD corresponding to some of the memory use data MUD stored in the host memory 210 is stored in the buffer memory 122, low power mode may be entered.

A background operation may be performed by the processor 121 in low power mode.

The processor 121 may update the journal data JD, which is changed according to the background operation, and at least a portion of the journal data JD A stored in the buffer memory 122 may be changed. For example, a physical block address mapped to LPN 0 corresponding to a logical block address may be changed from VPN A to VPN X. A physical block address mapped to LPN 500 corresponding to a logical block address may be changed from VPN B to VPN Y.

The processor 121 may update the journal data JD stored in the buffer memory 122 according to changed mapping information. In FIG. 6, the journal data JD A, B and C stored in the buffer memory 122 may be updated to updated journal data JD_upd A', B' and C'.

The processor 121 may manage the memory use data MUD stored in the host memory 210, without accessing the host memory 210 during the low power mode, to reflect an up-to-date state by updating the journal data JD stored in the buffer memory 122.

When a command of the host device 200 is received after leaving low power mode, the processor 121 may process the command using the updated journal data JD_upd stored in the buffer memory 122.

For example, when a command of the host device 200 is received, the processor 121 may check whether journal data JD related to the command exists in the buffer memory 122.

The processor 121 may scan the journal data JD stored in the buffer memory 122.

The processor 121 may perform scanning in the order of journal data JD corresponding to recently used memory use data MUD. For example, when the memory use data MUD A, B, C, D and E have been recently used in that order, and corresponding journal data JD are stored in the buffer memory 122, the processor 121 may perform scanning in the order of the updated journal data JD_upd A', B' and C', then the journal data JD D and E.

While scanning the journal data JD stored in the buffer memory 122, the processor 121 may check whether journal data JD is related to the command received from the host device 200.

For example, the updated journal data JD_upd B' may include mapping information required by a command from the host device 200. The processor 121 may translate a logical block address according to the command of the host device 200 into a physical block address using the updated journal data JD_upd B' stored in the buffer memory 122. Then the processor 121 may read data stored in the memory 110 on the basis of the translated physical block address, and may provide the read data to the host device 200.

Accordingly, the processor 121 need not read map data (MD) stored in the memory 110 to process a command of the host device 200. Command processing speed of the processor 121 after low power mode ends may be improved.

The processor 121 may store the updated journal data JD_upd in the host memory 210.

Referring to FIG. 7, after the switch is made from low power mode to active mode, the processor 121 may store the updated journal data JD_upd A', B' and C', which is stored in the buffer memory 122, in the host memory 210.

For example, during an idle period or a preset period, both active modes, the processor 121 may store the updated journal data JD_upd, which is stored in the buffer memory 122, in the host memory 210. In other embodiments, the host device 200 may read the updated journal data JD_upd from and store the updated journal data JD_upd in the host memory 210.

The updated journal data JD_upd may also be stored in the host memory 210 when a command from the host device 200 is processed. For example, as described above with reference to FIG. 6, the updated journal data JD_upd B' may be stored in the host memory 210 when the command of the host device 200 is processed.

The processor 121 may not transmit, to the host memory 210, the journal data JD D and E, from among the journal data JD stored in the buffer memory 122, which were not updated. Updates to the memory use data MUD stored in the host memory 210 may be performed only on memory use data MUD corresponding to the updated journal data JD_upd. Thus, the amount of data to be transmitted and received between the host device 200 and the storage device 100 for update of the memory use data MUD may be reduced.

The processor 121 of the controller 120 may manage, using the buffer memory 122, the journal data JD corresponding to the memory use data MUD stored in the host memory 210. The buffer memory 122 in which the journal data JD is stored may be a buffer memory 122 that is used for map data (MD). Or a buffer memory in which the journal data JD is stored may be separately disposed from the buffer memory 122 that is used for map data (MD).

Figure 8:
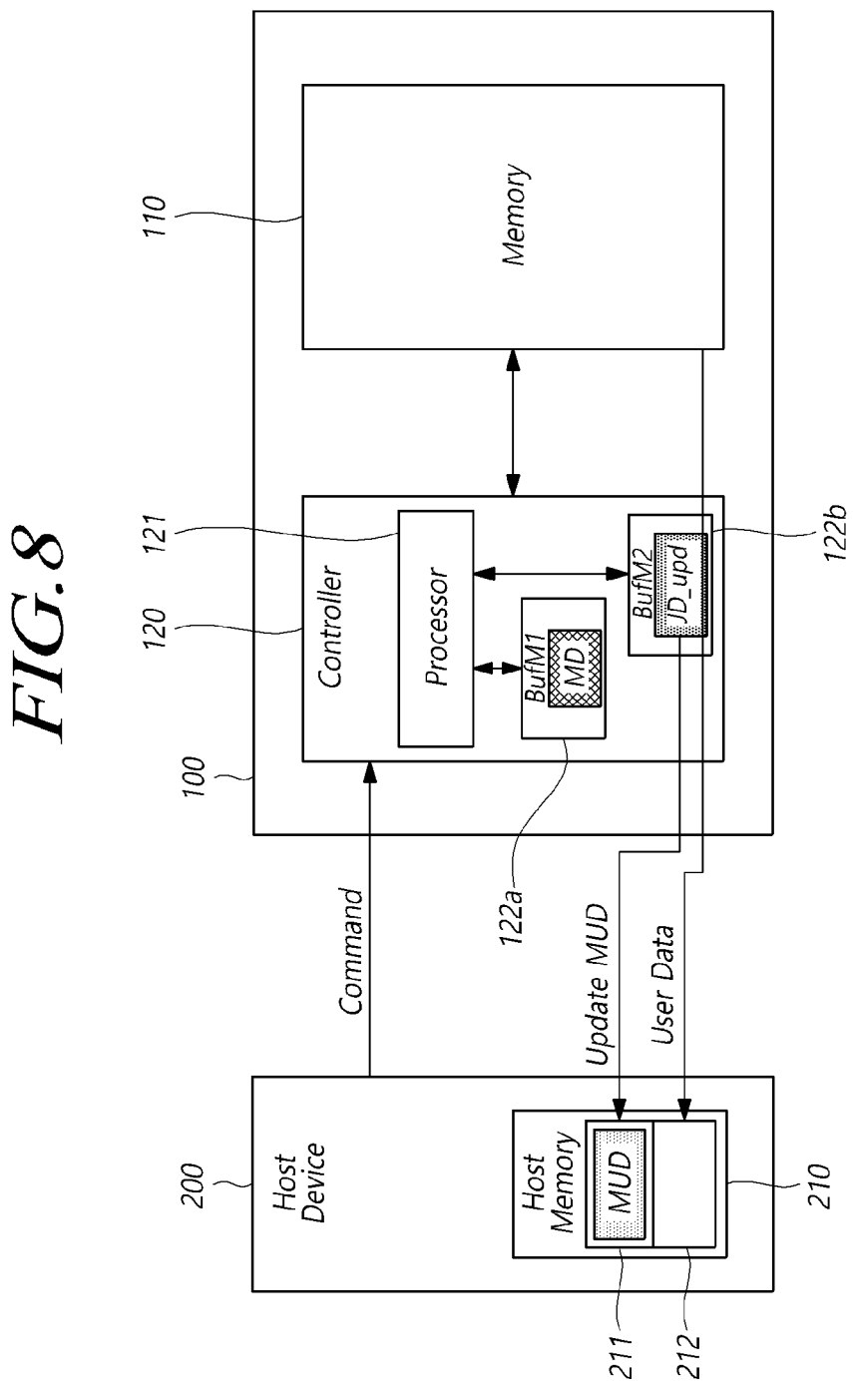
Figure 9:
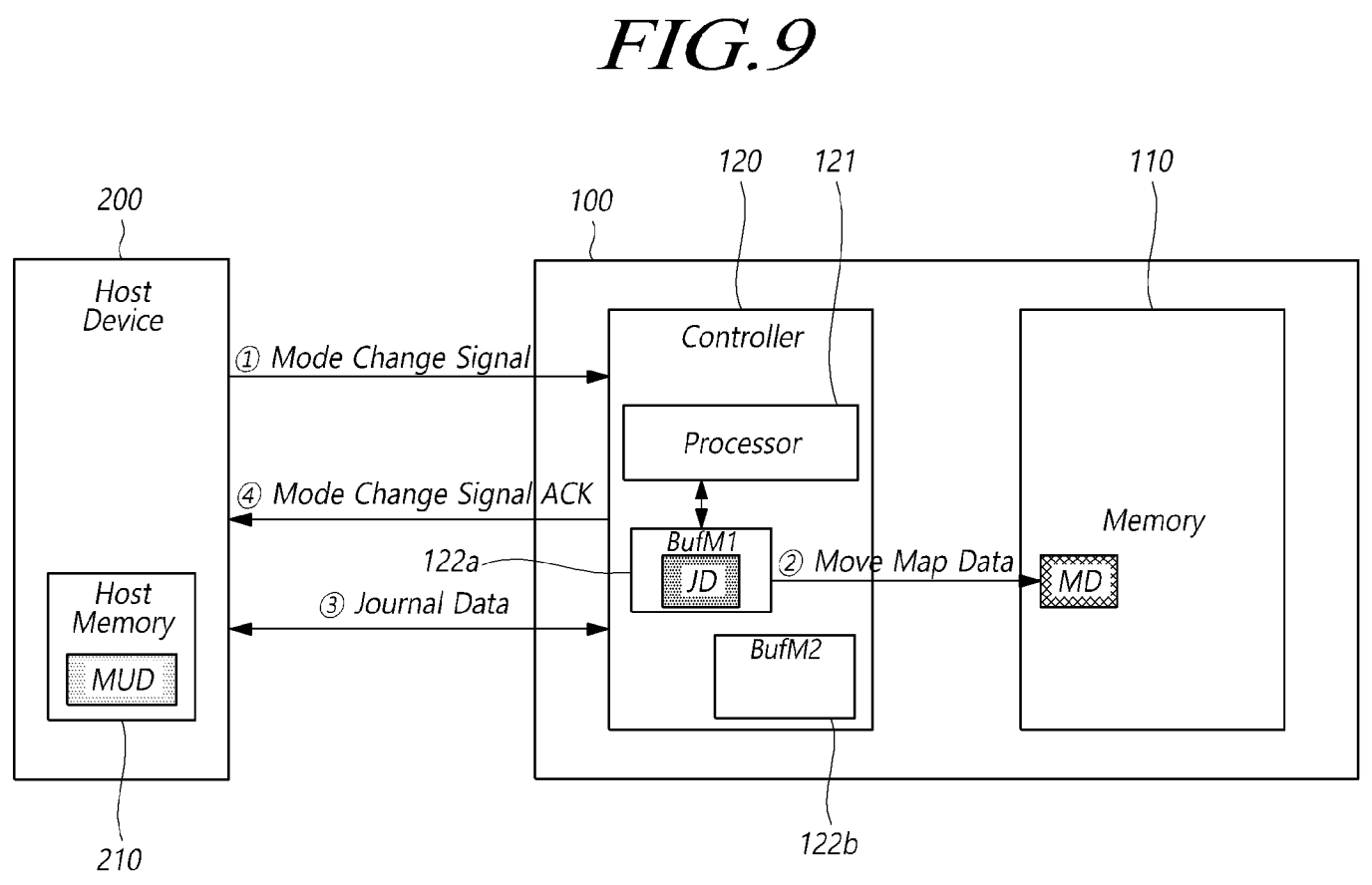

FIGS. 8 and 9 are diagrams illustrating a storage device storing journal data in a buffer memory according to embodiments of the disclosure.

Referring to FIG. 8, a controller 120 included in a storage device 100 may include a processor 121, a first buffer memory 122a and a second buffer memory 122b. The first buffer memory 122a and the second buffer memory 122b may be volatile memories, examples of which are described above.

The first buffer memory 122a may store, for example, map data MD. Map data MD may be stored in the first buffer memory 122a and a host memory 210, and may be used when an operation according to a command of a host device 200 is performed. The size of the first buffer memory 122a may be smaller than the size of the host memory 210.

The second buffer memory 122b may store journal data JD. For example, the second buffer memory 122b may be a buffer memory 122 that is used to store other types of data in a mode other than a low power mode.

When entering low power mode, the processor 121 may store journal data JD in the second buffer memory 122b. The processor 121 may move the map data MD stored in the first buffer memory 122a to the memory 110.

In low power mode, the processor 121 may update the journal data JD, which is changed according to a background operation. Updated journal data JD_upd may be stored in the second buffer memory 122b.

After low power mode, the processor 121 may receive a command from the host device 200. The processor 121 may process the command of the host device 200 using the updated journal data JD_upd stored in the second buffer memory 122b.

The processor 121 may read data according to the command of the host device 200 using the updated journal data JD_upd, and may provide the read data to the host device 200. The processor 121 may update memory use data MUD stored in the host memory 210 by providing the updated journal data JD_upd to the host device 200.

For example, the updated journal data JD_upd may be stored in a first memory region 211 of the host memory 210. User data according to the command processed using the updated journal data JD_upd may be stored, for example, in a second memory region 212 of the host memory 210.

With respect to the buffer memories 122 included in the controller 120, the processor 121 may manage the journal data JD using the second buffer memory 122b separately from the first buffer memory 122a for map data MD. As a result, the processor 121 may efficiently process a command of the host device 200 after low power mode.

In another embodiment, journal data JD may be stored and managed in the first buffer memory 122a, which was described above as storing map data MD.

For example, referring to FIG. 9, a controller 120 may include a first buffer memory 122a and a second buffer memory 122b. The first buffer memory 122a may be a buffer memory 122 that is used for map data MD. The second buffer memory 122b may be a buffer memory 122 that is used for data other than map data MD.

When operations are switched to a low power mode by the host device 200, the controller 120 may receive a mode change signal from the host device 200 as seen in ①.

For example, the processor 121 of the controller 120 may move the map data MD stored in the first buffer memory 122a to the memory 110 as seen in ②. As seen in ③, the processor 121 may generate journal data JD corresponding to memory use data MUD stored in the host memory 210, and may store the journal data JD in the first buffer memory 122a.

As seen in ④, the processor 121 may transmit a mode change acknowledgement signal to the host device 200.

In an active mode, and before a low power mode, map data MD may be stored and managed in, for example, the first buffer memory 122a and the host memory 210.

When switching from the active mode to the low power mode, the map data MD stored in the first buffer memory 122a may be managed by being moved to the memory 110, and the first buffer memory 122a enters a state in which data, other than map data MD, may be stored.

In low power mode, the journal data JD corresponding to memory use data MUD stored in the host memory 210 may be stored and managed in the first buffer memory 122a.

According to a background operation performed by the processor 121 during low power mode, the journal data JD stored in the first buffer memory 122a may be managed by being updated.

When an operation according to a command of the host device 200 is performed in an active mode and after a low power mode, the journal data JD stored in the first buffer memory 122a may be used. The memory use data MUD stored in the host memory 210 may be updated according to updated journal data JD_upd stored in the first buffer memory 122a.

At least a part of the map data MD moved to the memory 110 from the first buffer memory 122a when entering low power mode may be moved back to the first buffer memory 122a.

During low power mode, the journal data JD corresponding to the memory use data MUD of the host memory 210 may be managed using the first buffer memory 122a that was used for map data MD. Journal data JD may be managed and updated without adding a separate buffer memory 122.

The second buffer memory 122b included in the controller 120 may be used for other data. For example, journal data JD may be managed by using the first buffer memory 122a for map data MD and the second buffer memory 122b for data other than map data MD together.

Since the journal data JD corresponding to the memory use data MUD stored in the host memory 210 is stored and managed in at least a part of the first buffer memory 122a and the second buffer memory 122b, efficiency may be increased when processing a command of the host device 200 after the low power mode.

Figure 10:
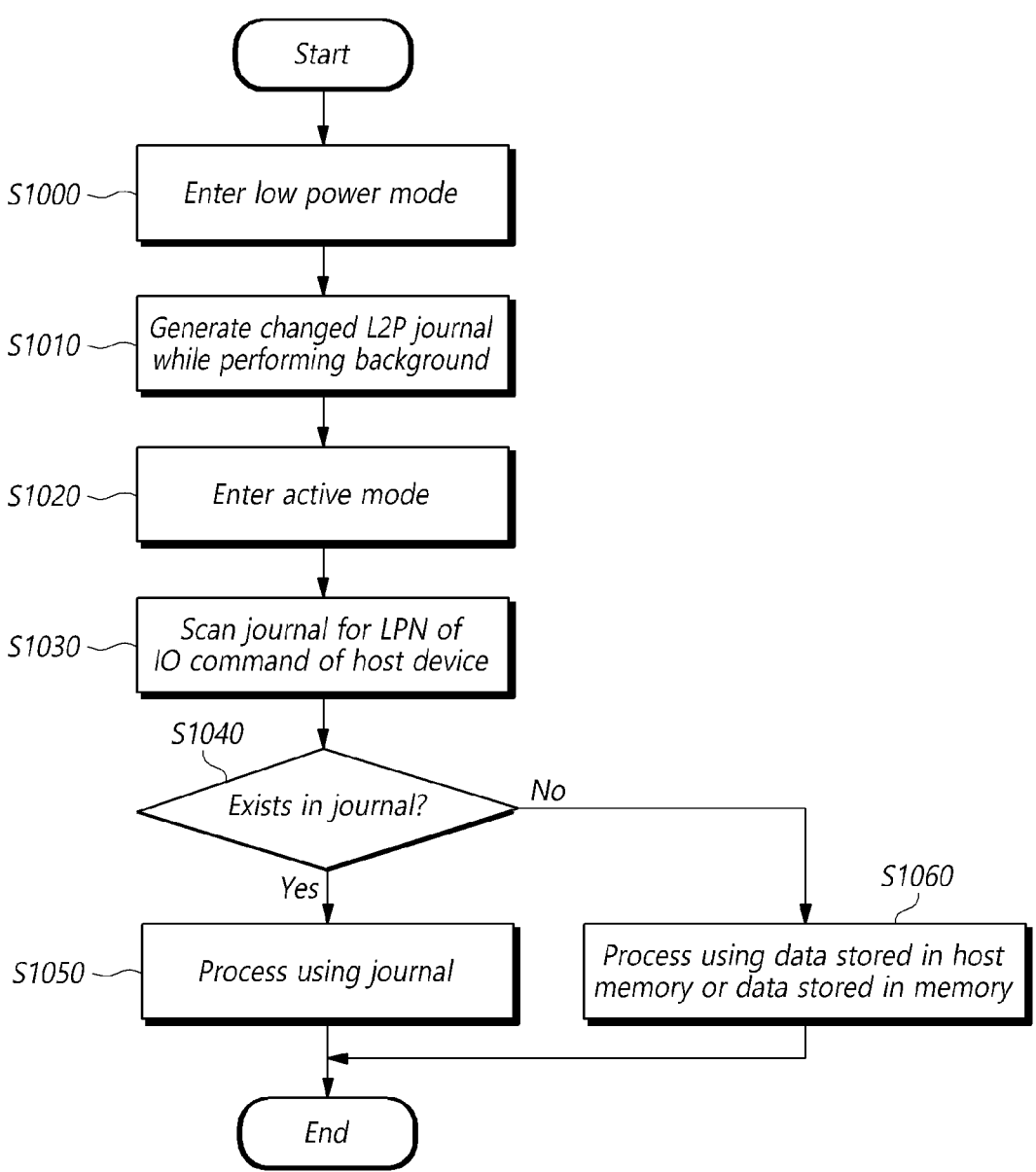
FIG. 10 is a diagram illustrating a method of operating a storage device according to an embodiment of the disclosure.

FIG. 10 is a diagram illustrating a method of operating a storage device according to an embodiment of the disclosure.

Referring to FIG. 10, a storage device 100 may enter a low power mode under control of the host device 200 (S1000).

When entering low power mode or before entering low power mode, the storage device 100 may store, in a buffer memory 122, journal data JD corresponding to memory use data MUD stored in a host memory 210. The memory use data MUD may be, for example, map data MD.

The storage device 100 may update the journal data JD stored in the buffer memory 122, according to map data MD, which is changed as a background operation is performed (S1010). When a physical block address mapped to a logical block address is changed, the change may be managed through update of the journal data JD.

The storage device 100 may enter an active mode under control of the host device 200 (S1020).

The storage device 100 may search for a logical block address according to a command of the host device 200 from among the journal data JD stored in the buffer memory 122 (S1030).

When the logical block address according to the command of the host device 200 exists as journal data JD stored in the buffer memory 122 (S1040), the storage device 100 may process the command of the host device 200 using the journal data JD stored in the buffer memory 122 (S1050).

Since the command of the host device 200 is processed using the journal data JD stored in the buffer memory 122, the storage device 100 may not read map data MD stored in the memory 110 in order to process the command. In this way, after switching from low power mode to active mode, the time required to process the command of the host device 200 may be decreased.

When the logical block address according to the command of the host device 200 does not exist as journal data JD in the buffer memory 122, the storage device 100 may process the command of the host device 200 by using the memory use data MUD stored in the host memory 210 or the map data MD stored in the memory 110 (S1060).

The storage device 100, which manages map data MD using the host memory 210 of the host device 200, may manage update of map data MD through journal data JD stored in the buffer memory 122, during a period in a low power mode, in which transmission and reception of data to and from the host device 200 are not performed or are limited.

After a switch is made from a low power mode to an active mode, processing of a command of the host device 200 may be easily performed by the journal data JD.

Since the memory use data MUD of the host memory 210 is updated on the basis of the updated journal data JD_upd, an amount of data to be transmitted and received for update purposes may be reduced.

By increasing management efficiency of map data MD in the low power mode, operational performance of the storage device 100 may be improved by using the host memory 210.

Although various embodiments of the disclosed technology have been described with particular specifics and varying details for illustrative purposes, those skilled in the art will appreciate that various modifications, additions and substitutions may be made based on what is disclosed or illustrated in the disclosed technology without departing from the spirit and scope of the disclosed technology as defined in the following claims.

What is claimed is:

1. A storage device comprising:
a memory; and
a controller configured to control the memory to store, in a buffer memory when receiving a mode change signal from a host device having a host memory, journal data corresponding to at least some of memory use data stored in the host memory, to process a command of the host device using the journal data, and to transmit a mode change acknowledgement signal, corresponding to the mode change signal, to the host device, wherein the journal data is data including basic data of at least two consecutive memory use data, from among at least some of the memory use data, and the number of memory use data consecutive to the basic data.

2. The storage device according to claim 1, wherein the controller performs a background operation after transmitting the mode change acknowledgement signal, and updates the journal data according to the background operation.

3. The storage device according to claim 2, wherein, when receiving the command from the host device, the controller searches the journal data stored in the buffer memory, and when journal data related to the command exists, provides data corresponding to the command to the host device using the journal data.

4. The storage device according to claim 3, wherein, when the journal data is not related to the command of the host device, the controller provides data corresponding to the command to the host device using map data stored in the memory.

5. The storage device according to claim 3, wherein, when the journal data is not related to the command of the host device, the controller provides data corresponding to the command to the host device using the memory use data stored in the host memory.

6. The storage device according to claim 5, wherein the memory use data, used to provide the data corresponding to the command to the host device, is not updated after the mode change acknowledgement signal is transmitted.

7. The storage device according to claim 3, wherein memory use data corresponding to the journal data, used to provide the data corresponding to the command to the host device, is stored in the host memory.

8. The storage device according to claim 7, wherein the memory use data corresponding to the journal data is stored in a first memory region of the host memory, and the data corresponding to the command is stored in a second memory region of the host memory.

9. The storage device according to claim 7, wherein memory use data corresponding to journal data updated after the mode change acknowledgement signal is transmitted, among journal data other than the journal data used to provide the data corresponding to the command to the host device, is stored in the host memory.

10. The storage device according to claim 1, wherein the buffer memory comprises:
a first buffer memory configured to store map data that is different from the memory use data; and
a second buffer memory configured to store the journal data.

11. The storage device according to claim 10, wherein the map data stored in the first buffer memory is stored in the memory when the mode change signal is received.

12. The storage device according to claim 1, wherein the buffer memory stores map data different from the memory use data, and the map data is stored in the memory when the mode change signal is received.

13. The storage device according to claim 1, wherein the journal data is data that is the same as at least some of the memory use data.

14. A computing system comprising:

a host device including a host memory; and a memory device including a memory, and the memory device is configured to store, in a buffer memory when receiving a mode change signal from the host device, journal data corresponding to at least some of memory use data stored in the host memory and used to process a command of the host device, and to transmit a mode change acknowledgement signal corresponding to the mode change signal to the host device, wherein the journal data is data including basic data of at least two consecutive memory use data, from among at least some of the memory use data, and the number of memory use data consecutive to the basic data.

15. The computing system according to claim 14, wherein, after the mode change acknowledgement signal is transmitted, the journal data is updated according to a background operation of the memory device.

16. The computing system according to claim 15, wherein, when the command by the host device is generated after the mode change acknowledgement signal is transmitted, memory use data corresponding to the updated journal data is stored in the host memory.

17. A controller comprising:

a buffer memory; and a processor configured to store, in the buffer memory when receiving a mode change signal from a host device, journal data corresponding to at least some of map data stored in a host memory included in the host device, and to transmit a mode change acknowledgement signal corresponding to the mode change signal to the host device, wherein the journal data is data including basic data of at least two consecutive map data, from among at least some of map data, and the number of map data consecutive to the basic data.

18. The controller according to claim 17, wherein, when receiving the mode change signal, the processor stores map data stored in the buffer memory in a memory located outside the controller, and stores the journal data in the buffer memory.

* * * * *